United States Patent [19]

Park

[11] Patent Number: 5,774,536
[45] Date of Patent: Jun. 30, 1998

[54] BALANCED NETWORK FOR USE IN A KEYPHONE SYSTEM

[75] Inventor: Moon-Kyeong Park, Gumi, Rep. of Korea

[73] Assignee: Samsung Electronics Co., Ltd., Suwon, Rep. of Korea

[21] Appl. No.: 676,960

[22] Filed: Jul. 8, 1996

[30] Foreign Application Priority Data

Jul. 8, 1995 [KR] Rep. of Korea ................. 20119/1995

[51] Int. Cl.[6] ................................. H04M 1/00
[52] U.S. Cl. .................... 379/156; 379/390; 379/391; 379/392
[58] Field of Search ................ 379/3, 5, 6, 24, 379/27, 156, 163, 391, 392, 393, 394, 398, 399, 403, 406, 410, 390, 164, 165, 166, 157; 381/108, 104

[56] References Cited

U.S. PATENT DOCUMENTS

| | | |
|---|---|---|
| 3,892,924 | 7/1975 | Vachon . |
| 4,132,863 | 1/1979 | Smith ...................................... 379/398 |
| 4,177,361 | 12/1979 | Birck ...................................... 379/408 |
| 4,400,588 | 8/1983 | Stobbs et al. ........................... 379/392 |
| 4,445,002 | 4/1984 | Terry ...................................... 379/391 |
| 4,552,996 | 11/1985 | De Bergh ............................... 379/3 |
| 4,570,035 | 2/1986 | Pinede et al. ........................... 379/156 |
| 4,791,638 | 12/1988 | Fukie et al. . |
| 4,815,127 | 3/1989 | Sato ........................................ 379/417 |
| 5,029,203 | 7/1991 | Ikefuji et al. ........................... 379/391 |
| 5,033,081 | 7/1991 | Tsurusaki . |
| 5,048,080 | 9/1991 | Bell et al. ............................... 379/165 |
| 5,133,007 | 7/1992 | Nishimura .............................. 379/405 |
| 5,442,697 | 8/1995 | McGary et al. ........................ 379/5 |
| 5,467,394 | 11/1995 | Walker et al. .......................... 379/391 |
| 5,495,527 | 2/1996 | Rollhaus, Jr. et al. . |
| 5,640,450 | 6/1997 | Watanabe ............................... 379/391 |

*Primary Examiner*—Curtis A. Kuntz
*Assistant Examiner*—Rexford Barnie
*Attorney, Agent, or Firm*—Robert E. Bushnell, Esq.

[57] ABSTRACT

A balanced network in a keyphone system has a filtering unit which is composed of: first and second filtering circuits, formed on the transmission path and having an inverted-phase feature, for adjusting the level of the transmission signal and for removing spurious waves thereof; an inverted-phase signal branch point disposed between the first and second filtering circuits, for branching out an inverted-phase transmission signal; an operational amplifier disposed on the reception path, for adjusting a level of the reception signal; a signal superimposing node disposed ahead of an input of the operational amplifier; and a feedback signal level adjusting circuit disposed between the inverted-phase signal branch point and the signal superimposing node, for adjusting the level of the inverted-phase transmission signal which has been branched out from the inverted-phase signal branch point so as to reduce a feedback signal, transmitted from the transmission path to the reception path through the common node, to a desirable level.

5 Claims, 2 Drawing Sheets

BALANCED NETWORK FOR USE IN A KEYPHONE SYSTEM

CROSS REFERENCE TO RELATED APPLICATION

This application makes reference to, incorporates the same herein, and claims all benefits accruing under 35 U.S.C. §119 from an application for *Balanced Network For Use In A Keyphone System* earlier filed in the Korean Industrial Property Office on 8 Jul. 1995 and there duly assigned Ser. No. 20119/1995.

BACKGROUND OF THE INVENTION

1. Field of the Invention

The present invention relates to a keyphone system, and more particularly to an improved balanced network for attenuating side tones of a telephone.

2. Description of the Related Art

In a digital keyphone system, a speech connection switch (generally referred to as a "time switch") is respectively connected between two subscribers through a transmission portion and a reception portion. Therefore, a subscriber's telephone or a connection portion of a central office line which transmits/receives a speech signal over a single line needs a circuit for combining transmission and reception paths into one line or for separating one line into the transmission and reception paths. A balanced network is used for such a circuit and serves to attenuate the side tone of a telephone. The side tone attenuation greatly affects the speech quality of the keyphone system. The term "side tone" as used herein refers to the sound heard in a telephone receiver originating in a signal being transmitted from the associated transmitter.

In a priory art balanced network applied to a keyphone system, a transmission path and a reception path are respectively connected between a time switch and a line impedance connected one line on which a subscriber port is disposed. The reception path may include two stages of cascaded operational amplifiers and the transmission path may include three stages of operational amplifiers. The prior art network has a common node A, herein refer to as a "superimposing)" node on which a transmission signal and a reception signal are superimposed. A speech signal to be output to a receiver through a reception path must be fedback to a transmitter through a superimposing node of a receiver connection portion that is, the reception signal is applied as a feedback signal to the superimposing node A of the transmitter connection part over the transmission path and the feedback signal is fedback to the receiver and then is fedback again to the transmitter, thus causing the speech signal to circulate within the system and become a sidetone.

In order to attenuate the sidetone, the prior art balanced network supplies a feedback signal from the transmitter path to a noninverting input terminal of one of the operational amplifiers of the reception path so as to attenuate the sidetone.

In the prior art balance network as described above, it is very difficult to adjust the attenuation degree of the side tone and the speech sensitivity to a desired state, since it is difficult to set a circuit parameter for determining the attenuation degree of the side tone and it is more difficult for a user to readjust the parameter as needed.

Both Vachon and Rollhaus Jr. et al., U.S. Pat. Nos. 3,892,924 and 5,495,527 disclose sidetone reduction circuitry. Vachon uses a resistor network to feedback signals to the inverting input of an operational amplifier in the reception path whereas Rollaus Jr. et al. requires the use of an entire separate operational amplifier to feedback a signal to one path in a telephone speakerphone arrangement.

However, neither Vachon nor Rollhaus Jr. et al. teaches or suggests the recited features of the present invention which result in an improved simplified balanced network for attenuating sidetones in a keyphone system.

SUMMARY OF THE INVENTION

It is therefore an object of the present invention to provide a balanced network for providing an improved speech quality. It is another object of the present invention to provide a balanced network capable of easily adjusting the speech sensitivity and the degree of side tone to a desired state.

To achieve the above objects of the present invention, a balanced network in a keyphone system comprises: a filtering unit composed of first and second filtering circuits, formed on the transmission path and having an inverted-phase feature, for adjusting the level of the transmission signal and removing spurious waves thereof; an inverted-phase signal branch point placed between the first and second filtering circuits, for branching out an inverted-phase transmission signal; an operational amplifier disposed on the reception path, for adjusting level of the reception signal; a signal superimposing node disposed at a point ahead of an input of the operational amplifier; and a feedback signal level adjusting circuit disposed between the inverted-phase signal branch point and the signal superimposing node, for adjusting the level of the inverted-phase transmission signal which has been branched out from the inverted-phase signal branch point by using a preset parameter so as to reduce a feedback signal, transmitted from the transmission path to the reception path through the common node, to a desirable level.

BRIEF DESCRIPTION OF THE DRAWINGS

These and various other features and advantages of the present invention will be readily understood with reference to the following detailed description taken in conjunction with the accompanying drawings, in which.

DETAILED DESCRIPTION OF THE PREFERRED EMBODIMENT

Figure 1:
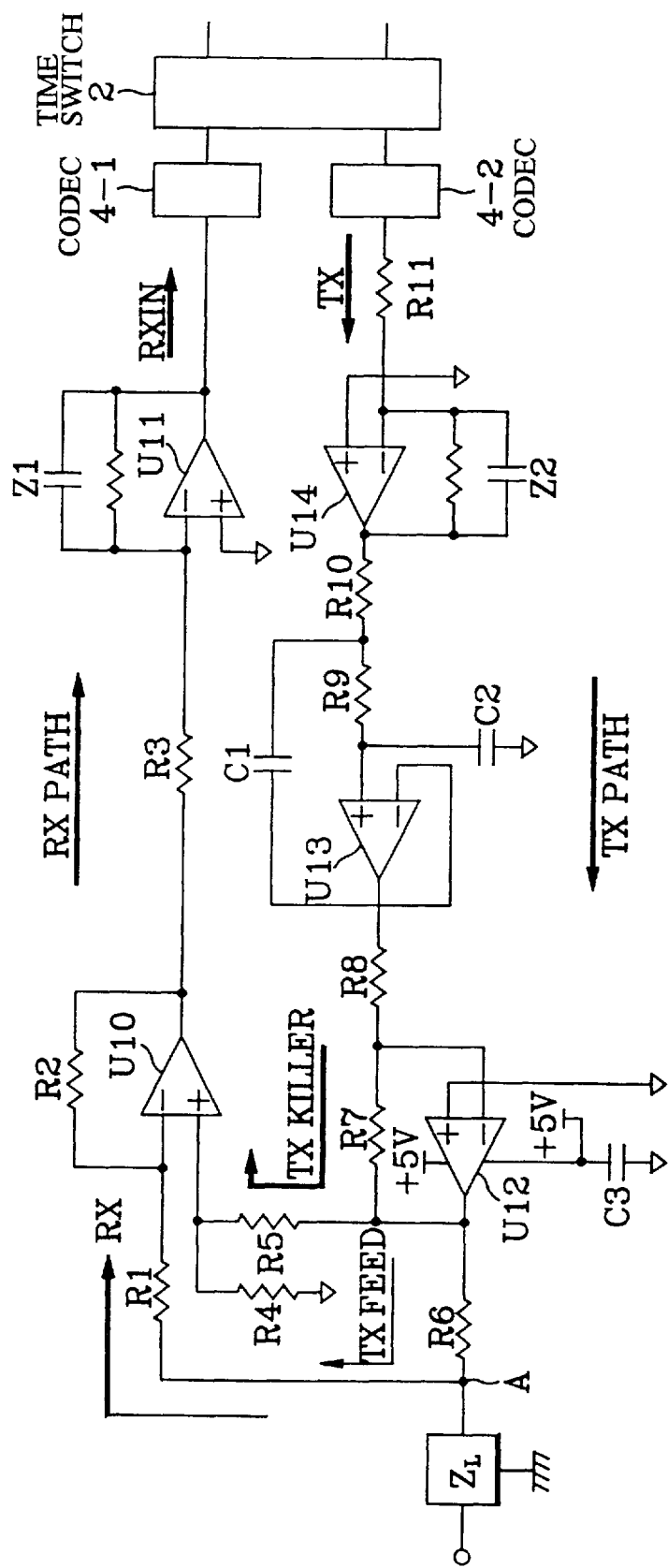
FIG. 1 is a diagram showing configuration of a prior art of a balanced network.

A preferred embodiment of the present invention will now be described in detail with reference to the accompanying drawings. It should be noted that the same parts or elements of the drawings represent the same number or symbol wherever possible. FIG. 1 shows a configuration of a prior art balanced network applied to a keyphone system. The balanced network of FIG. 1 has resistors R1 to R11 and active elements OP AMPs U10 to U14.

A transmission path TX PATH and a reception path RX PATH (which are indicated by an arrow in the figure) are respectively connected between a time switch 2 and a line impedance $Z_L$ connected to one line on which a subscriber port is disposed. On the reception path RX PATH, two stages of OP AMPs composed of OP AMPs U10 and U11 are disposed, and on the transmission path TX PATH, three stages of OP AMPs composed of OP AMPs U12, U13 and U14 are disposed. Codecs 4–1 and 4–2 are disposed on the reception/transmission paths RX PATH and TX PATH, respectively, and are adjacent to the time switch 2.

In FIG. 1, a common node A is a superimposing node on which a transmission signal TX and a reception signal RX are superimposed. It is assumed in the present invention that the common node A is a superimposing node of a transmitter connection part. A speech signal to be output to a receiver through the reception path RX PATH i.e. the reception signal RX, must be fedback to a transmitter through a superimposing node (not shown in FIG. 1) of a receiver connection part. That is, the reception signal RX is applied as a feedback signal TX FEED to the superimposing node A of the transmitter connection part over the transmission path TX PATH. The feedback signal TX FEED is fedback to the receiver and then is fedback again to the transmitter. Consequently, the speech signal circulates within the system.

Such a speech signal becomes side tone. In FIG. 1, the OP AMP U10 on the reception path RX PATH is used to attenuate the side tone, i.e. to suppress the level of the feedback signal TX FEED. The feedback signal TX FEED and reception signal RX are applied to an inverted input terminal (−) of the OP AMP U10, and a feedback level adjusting signal TX KILLER is applied to a non-inverted input terminal (+) thereof. Therefore, the OP AMP U10 receives the feedback signal TX FEED and reception signal RX at its inverted input terminal (−) and adjusts the level of the feedback signal TX FEED by using the feedback level adjusting signal TX KILLER.

Figure 2:
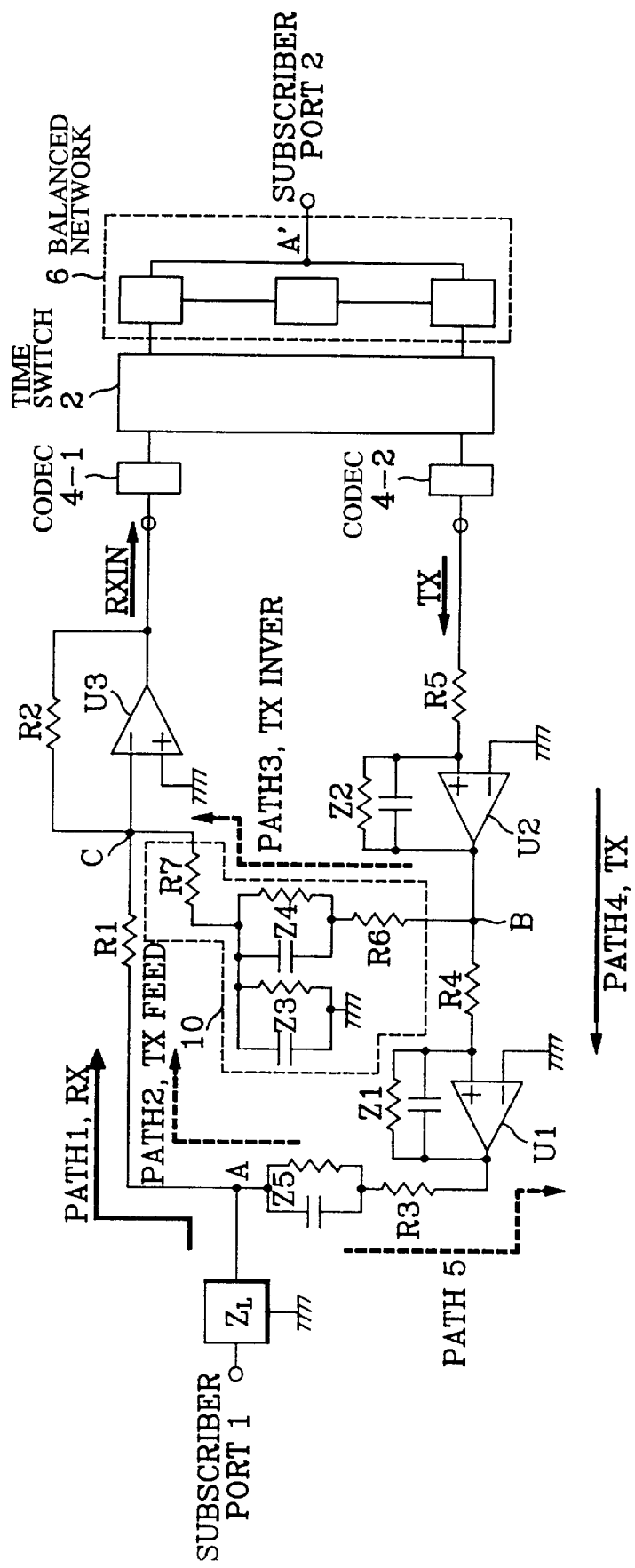
FIG. 2 is a diagram showing configuration of a balanced network according to the present invention.

FIG. 2 shows a configuration of a balanced network according to the present invention. In FIG. 2, it is assumed that a port connected to a line impedance $Z_L$ is a subscriber port 1. It should be noted that the reference numeral 6 connected to an output of a time switch 2 is another balanced network. It is assumed that the balanced network 6 is connected to a subscriber port 2.

Referring to FIG. 2, one stage of OP AMP composed of an OP AMP U3 is disposed on the reception path RX PATH, and two stages of OP AMPs composed of OP AMPs U1 and U2 are disposed on the transmission path TX PATH. A common node A is a superimposing node of the transmission and reception signals TX and RX. A node B is placed between the OP AMPs U1 and U2 and is a branch point of an inverted-phase transmission signal TX INVER. A node C is disposed ahead of an inverted input terminal (−) of the OP AMP U3 and is a superimposing node of the reception signal RX, inverted-phase transmission signal TX INVER and feedback signal TX FEED.

FIG. 2 has five signal paths PATH1 to PATH5 each having its own function. Construction and operation of the present invention will now be described in detail referring to the signal paths PATH1 to PATH5.

The path PATH1 is formed between the subscriber port 1 and the time switch 2, and the reception signal RX input from the subscriber port 1 is applied to the time switch 2 through the common node A. The level of the reception signal RX is determined by the amplification factor dB of the OP AMP U3 which is obtained by a following equation:

$$dB = \log \frac{R2}{R1}.$$

The path PATH5 is formed between the common node A and the OP AMP U1, and determines a terminal impedance Z5+R3 of a subscriber line. Since the terminal impedance and the significantly low output impedance ($\cong 0\omega$) of the OP AMP U1 allow the reception signal RX applied to the common node A to be passed to ground by the OP AMP U1, the reception signal RX is not applied to the branch point B.

The path PATH4 is for transmitting the transmission signal TX from the time switch 2 to the subscriber port 1. A two stage filtering circuit having the OP AMP U1 containing an impedance Z1 and the OP AMP U2 containing an impedance Z2 is disposed on the path PATH4 and has two functions. Firstly, the filtering circuit has an inverted-phase feature and prevents the transmission of spurious waves of the transmission signal TX. Secondly, the filtering circuit adjusts the level of the transmission signal TX. The level of the transmission signal TX is determined by respective amplification factors of the OP AMPs U1 and U2, and in this case, the amplification factors dB1 and dB2 of the OP AMPs U1 and U2 can be obtained by the following equations:

$$dB1 = \log \frac{|Z1|}{R4}, \ dB2 = \log \frac{|Z2|}{R5}.$$

The path PATH2 is formed between the branch point B on the transmission path TX PATH and the superimposing node C on the reception path RX PATH through the common node A. The transmission signal TX which is transmitted from the subscriber port 2 to the subscriber port 1 is fedback over the path PATH2. That is, there is a feedback signal TX FEED of the transmission signal TX. An A' of the subscriber port 2 also has such a feedback signal TX FEED. Thus, the feedback signal TX FEED which continuously circulates within the speech path may deteriorate the speech quality.

In order to suppress the feedback signal TX FEED, the present invention has the path PATH3 disposed between the branch point B on the transmission path TX PATH and the superimposing node C on the reception path RX PATH. A feedback signal level adjusting circuit 10 having impedances Z3 and Z4 (each composed of a resistor and a capacitor) and resistors R6 and R7 is formed therebetween for properly adjusting the level of the feedback signal TX FEED.

Since the inverted-phase signal branch point B is disposed between the OP AMPs U1 and U2 having the inverted phase feature, the inverted-phase transmission signal TX INVER applied to the path PATH3 has an opposite phase to the feedback signal TX FEED. The inverted-phase transmission signal TX INVER applied to the path PATH3 is level-adjusted by the feedback signal level adjusting circuit 10 and then is applied to the superimposing node C. Consequentially, the inverted-phase transmission signal TX INVER and the feedback signal TX FEED are added at the superimposing node C.

A signal RXIN which is resulted from the transmission signal TX and is output from the OP AMP U3 which receives the output signal of the superimposing node C can be obtained by a following equation. Thus, the output signal RXIN becomes a side tone-attenuated value.

$$RXIN = TX\ FEED + TX\ INVER$$

$$= \left( VTX \times \frac{ZL}{ZL + Z5 + R3} \times \frac{R2}{R1} \right) +$$

$$\left( -VTX \times \frac{Z3}{Z3 + Z4 + R6} \times \frac{R2}{R7} \right)$$

$$= VTX \times R2 \times \left( \frac{ZL}{(ZL + Z5 + R3) \times R1} - \frac{Z3}{(Z3 + Z4 + R6) \times R7} \right),$$

where VTX is a voltage of the transmission signal TX at node B and $Z_L$ is a line impedance.

In the above equation, the speech sensitivity and the attenuation degree of the side tone can be easily adjusted to a desired state by adjusting the parameter of each circuit. It should be noted that if the side tone is completely suppressed, the speech sensitivity may not be desirable.

Finally, the main differences between the prior art circuit and the circuit according to the present invention can be summarized as following table 1.

TABLE 1

|  | Prior Art | Present Invention |
|---|---|---|
| RX Path | Use two stages of OP AMP | Use one stage of OP AMP |
| TX Path | Use three stages of OP AMP | Use two stages of OP AMP |
| Level adjusting of TX FEED | Adjust TX FEED level by using (+), (−) terminals OP AMP on RX path *(−) terminal: input a TX FEED *(+) terminal: input a TX KILLER | Adjust TX FEED level of by adding a TX FEED to an inverted-phase signal of an OP AMP on TX path at an OP AMP on RX path |

As described above, the present invention can improve the speech quality and can easily adjust the speech sensitivity and the degree of side tone to a desired state, by using the phase difference between the transmission and reception paths (the inverted-phase output of the OP AMP on the transmission path TX PATH). Further, the present invention can embody the balance network with less OP AMPs as compared to the prior art, i.e., by using only two stages of OP AMPs on the transmission path TX PATH and one stage of OP AMP on the reception path RX PATH.

While there has been illustrated and described what is considered to be preferred embodiment of the present invention, it will be understood by those skilled in the art that various changes and modifications may be made without departing from the scope of the present invention. Therefore, it is intended that the present invention not be limited to the particular embodiment disclosed as the best mode contemplated for carrying out the present invention, but that the present invention includes all embodiments falling within the scope of the appended claims.

What is claimed is:

1. A balanced network in a keyphone system having a transmission path which is firstly branched out from a common node connected to a first subscriber port, over said transmission path a transmission signal from a second subscriber port being transmitted, a reception path which is secondly branched out from said common node, over said reception path a reception signal from said first subscriber port being transmitted, and a speech connection switch for switching the speech forming between said first and second subscriber ports, said balance network comprising:

a filtering unit comprising first and second cascaded filtering circuits, disposed on said transmission path and having an inverted-phase feature, for adjusting the level of said transmission signal and for removing spurious waves thereof;

an inverted-phase signal branch point disposed between said first and second filtering circuits, for branching out an inverted-phase transmission signal;

an operational amplifier disposed on said reception path, for adjusting a level of said reception signal;

a signal superimposing node disposed ahead of an input of said operational amplifier; and a feedback signal level adjusting circuit disposed between said inverted-phase signal branch point and said signal superimposing node, for adjusting the level of said inverted-phase transmission signal which has been branched out from said inverted-phase signal branch point so as to reduce a feedback signal, transmitted from said transmission path to said reception path through said common node, to a desirable level.

2. The balanced network as claimed in claim 1, further comprising an impedance unit disposed between said common node and an output terminal of said filtering unit, for preventing said reception signal, so applied from said first subscriber port to said second subscriber port through said common node, from being fedback to said transmission path.

3. The balanced network as claimed in claim 1, said feedback signal level adjusting circuit comprising a +-pad network composed of resistors and capacitors.

4. The balanced network as claimed in claim 3, said feedback signal level adjusting circuit comprising: first, second, and third series connected resistors disposed between said inverted-phase signal branch point and said signal superimposing node; a fourth resistor connected between a junction of the second and third resistors and a signal ground; and first and second capacitors irrespectively connected in parallel with said second and fourth resistors.

5. The balanced network as claimed in claim 2, said impedance unit comprising first and second series connected resistors disposed between said common node and said output terminal of said filtering unit and a capacitor connected in parallel with said second resistor.

\* \* \* \* \*